United States Patent [19]
Elliott et al.

[11] Patent Number: 5,869,124
[45] Date of Patent: Feb. 9, 1999

[54] EDIBLE SPREAD

[75] Inventors: Peter William Elliott, The Hague; Maaike Rina Greep, Maassluis; Johanna Antonia van Meeteren, Vlaardingen; Leendert Hendrik Wesdorp, Schiedam, all of Netherlands

[73] Assignee: Van den Bergh Foods Co., division of conopco, Inc., Lisle, Ill.

[21] Appl. No.: 99,767

[22] Filed: Jul. 29, 1993

Related U.S. Application Data

[63] Continuation of Ser. No. 823,079, Jan. 14, 1992, abandoned, which is a continuation of Ser. No. 436,835, Nov. 13, 1989, abandoned.

[30] Foreign Application Priority Data

Nov. 16, 1988 [GB] United Kingdom .................. 8826770

[51] Int. Cl.⁶ .............................. A23D 7/00; A23D 7/04
[52] U.S. Cl. ............................................ 426/601; 426/603
[58] Field of Search .................................. 426/601, 602, 426/603, 607

[56] References Cited

U.S. PATENT DOCUMENTS

| | | | |
|---|---|---|---|
| 1,247,483 | 11/1917 | Adams et al. .......................... | 426/603 |
| 3,026,207 | 3/1962 | Murray . | |
| 3,360,377 | 12/1967 | Spitzer et al. . | |
| 3,955,010 | 5/1976 | Chozianin et al. ..................... | 426/605 |
| 4,304,795 | 12/1981 | Takeda et al. .......................... | 426/607 |
| 4,341,812 | 7/1982 | Ward et al. ............................. | 426/607 |
| 4,366,181 | 12/1982 | Dijkshoorn et al. .................... | 426/607 |
| 4,386,111 | 5/1983 | Van Heteren et al. ................. | 426/607 |
| 4,390,561 | 6/1983 | Blair et al. .............................. | 426/607 |
| 4,425,371 | 1/1984 | Stratmann et al. ..................... | 426/603 |
| 4,447,462 | 5/1984 | Tafuri et al. ............................ | 426/607 |
| 4,510,167 | 4/1985 | Schmidt et al. ........................ | 426/607 |
| 4,610,899 | 9/1986 | Schmidt .................................. | 426/607 |
| 4,791,000 | 12/1988 | Holemans et al. ..................... | 426/607 |
| 4,996,074 | 2/1991 | Seiden et al. . | |

FOREIGN PATENT DOCUMENTS

| | | |
|---|---|---|
| 78568 | 5/1983 | European Pat. Off. . |
| 3435269 | 3/1986 | Germany . |
| 52-069411 | 6/1977 | Japan . |
| 54-034305 | 3/1979 | Japan . |

OTHER PUBLICATIONS

TIBTECH—Feb. 1987, vol. 5, pp. 40–46 "The application of genetic engineering to oilseed crops".

Bailey's Indistrial Oil and Fat Products, vol. 3, (1985), pp. 61–63 and 69–70.

Bonanome et al Effect of Dietary Stearic Acid on Plasma Cholesterol and Lipoprotein Levels 1988 The New England J of Medicine 318(19) 1244–1248.

Abstract–Graef et al. JAOCS 1985, 62(4) 773–5 Chapter by Keith J. Smith of Biotechnology for the Oils and Fats Industry Chapter 9 by Hammond et al. of Biotechnology for the Oils and Fats Industry.

Anderson and Williams, "Margarine" (2d revsd edn ) pp. 4–5.

Bailey's Industrial Oil and Fat Products, Third Edition, 1964 pp. 338–343.

Crop Science, vol. 23, Jan.–Feb. 1983, Hammond & Fehr, Registration of A6 Germplasm Line of Soybean pp. 192–193.

Swern 1979 Bailey Industrial Oil and Fat Products vol. 1, 4th Edition Wiley–Interscience Publication New York pp. 315,318,323,355,365,371,378,379,384,391,395,400.

Gunstone et al 1983 Lipids in Foods Chemistry, Biochemistry and Technology Pergamon Press New York, pp. 147, 152–155.

*Primary Examiner*—Carolyn Paden
*Attorney, Agent, or Firm*—Gerard J. McGowan, Jr.

[57] ABSTRACT

An edible spread which comprises a water and oil emulsion in which the fat phase is essentially a single, natural vegetable fat and processes for producing such a spread. While certain non-physical properties of the fat phase, such as its color, may be due to the presence of other fats than that responsible for the characteristic physical properties, the fat phase of the spreads of the invention contain low amounts of such natural additives; the physical properties of the fat phase are essentially determined by a single fat which has not been subjected to any chemical treatment other than refining.

13 Claims, No Drawings

EDIBLE SPREAD

This application is a continuation application of Ser. No. 07/823,079, filed Jan. 14, 1992, now abandoned, which is a continuation application of Ser. No. 07/436,835, filed Nov. 13, 1989, now abandoned.

BACKGROUND OF THE INVENTION

The present invention relates to an edible spread and to a processes for producing such a spread.

Butterfat, although possessing a reputation as a "healthy natural" fat contains a high proportion of fats having a relatively low level of unsaturation. Details of the exact composition of butterfat can be found in International Dairy Federation document 125 (pp 4–13). Typical compositions for milk fat are 61% saturated fatty acids, 36% cis mono-unsaturated fatty acids and 3% cis poly-unsaturated (so-called "essential") fatty acids.

In recent years there has been considerable medical interest in reducing the dietary intake of saturated fats. Consumers now find a diet rich in saturated fat unacceptable, and research has long been concerned with how a proportion of the fat may be replaced by vegetable oils, which are accepted to be dietetically more acceptable. In addition, recent years have seen an increasing consumer awareness that the total cholesterol level in the diet should not be too high. This has again contributed to a shift from dairy fat consumption to vegetable fat consumption.

The first margarines were manufactured from animal tallow. Vegetable oils were first added to margarine fat compositions towards the end of the nineteenth century, in proportions of around 20% in order to soften the end product. As the price of animal fats rose, use of vegetable fat increased until by 1907 vegetable fat comprised some 25–30% of the fat blend of European margarines. It was not possible to incorporate more than this proportion as the resulting products became far too soft during warm weather.

In 1912–13 edible hydrogenated fats became available in commercial quantities. Hydrogenation increases the melting point of fats which would otherwise be liquid at ambient temperature and tends to products with a smooth melting curve. With the advent of these harder fats it became possible to produce vegetable fat blends having similar melting properties to animal fats and the margarine industry became relatively independent of the beef fat and lard market. However, partially hydrogenated fats contain a reduced level of cis-unsaturated fatty acids and fully hydrogenated fats contain exclusively saturated fats. These chemically modified fats are considered less acceptable than unmodified vegetable fats. Moreover, hydrogenation and other modifications of edible fats require expensive catalysts and a considerable investment in plant and workforce.

The properties of fats may also be modified by fractionation, with or without solvents. One difficulty of fractionation is that many separations result in fat fractions with limited usefulness.

In addition to the overall fatty acid content of fats, the stereochemistry of triacyl-glycerols and the effect of this upon the physical properties of the fat and spreads containing these fats has been investigated. As a result, interesterification, carried out in the presence of catalysts has been used to modify the physical properties of fats. This has resulted in fatty materials which enable spreads to be made with low levels of saturated fats. Interesterification is a complex, expensive processing step and requires the use of expensive enzyme catalysts if side reactions are to be minimised.

In considering this prior art it is convenient to use the notation given in table 1, as used throughout this specification:

TABLE 1

| FATTY ACID NOTATION | | |
|---|---|---|
| S | stearic acid, | (C18 saturated) |
| P | palmitic acid, | (C16 saturated) |
| M | lauric fats, | (C12–C14 fats) |
| H | stearic + palmitic | (C16–C18 saturated) |
| O | oleic acid, | (C18 cis unsaturated) |
| L | linoleic acid, | (C18 cis cis diunsaturated) |
| E | mono-trans fat, and | (C16–C18 mono trans) |
| U | oleic + linoleic. | (C16–C18 unsaturated) |

It should be noted that the "E" fats occur in nature only in very low concentrations: trans carbon-carbon linkages are generally only found in chemically hydrogenated fats.

U.S. Pat. No. 4,267,643 discloses some of the S2E and SES ratios which can be obtained by non-fractionated but hydrogenated vegetable oils.

JP 54/034305 and JP 52/069411 disclose specific S2U, SU2, S3 and U3 ratios obtained by mixing of co-randomised vegetable fats.

The effect of S20 fats on physical properties of a fat is discussed in EP 78568 and U.S. Pat. No. 4,447,462. The effect of S2U fats on physical properties is discussed in EP 109721.

In general the prior art indicates that the symmetric HUH triglyceride is preferable to the HHU triglyceride. Fat blends comprising plurality of components obtained from differing sources or requiring extensive, and expensive, modification of part or all of the fats present have been suggested as a source of this material.

As well as hydrogenation, fractionation and interesterification, saponification has been proposed as a suitable modification of fats, so as to stabilize spreads containing vegetable fats. For example in U.S. Pat. No. 3,026,207, over 5% of a soap is added to a fat to stabilize a water and oil emulsion. As is well known, soap is traditionally a chemically modified fat.

Despite over a century of research, workers have been unable to produce an edible spread which, like butter, comprises a single vegetable fat which has not been subjected to modification.

SUMMARY OF THE INVENTION

We have now determined how unmodified vegetable fat may be employed as the fat phase of a spread. The invention set out herein provides an edible, water and oil containing emulsion in which the fat phase is a non-chemically modified, vegetable fat or a blend of such fats.

It is observed that certain non-physical properties of the fat phase, such as the colour may be due to the presence of other fats than are responsible for the characteristic physical properties. For example, colour may be modified by the addition of a small quantity of unrefined palm oil to the fat blend. However, while the fat phase of spreads according to the present invention contain low amounts of such natural additives and the physical properties of the fat phase of emulsions according to preferred embodiments of the invention are essentially determined by a single fat which has not been subjected to any chemical treatment other than refining.

Typically, the vegetable fat contains a majority of 18-carbon fatty acids. These are generally both saturated and cis unsaturated fatty acids. As mentioned above the naturally occurring 18-carbon fatty acids include S, O and L fats in the notation of the present specification, with insignificant quantities of the trans isomer (E). 18-carbon fatty acids (stearic, oleic and linoleic) are preferred to 16-carbon and shorter chain fatty acids, such as are found in palm oil and the so-called lauric fats for nutritional reasons.

Generally, the vegetable fat contains at least 30% H2U triglycerides as herein defined, S2U triglycerides being preferred.

Preferably at least 50% of the H2U triglycerides are in the symmetric (HUH) configuration, and more preferably at most 50% of the H2U triglycerides are H2O. In a preferred embodiment of the present invention at least 90% of both the H2O and the H2L triglycerides are present in the symmetric configuration, as HOH and HLH.

In particular embodiments of the invention the HUH:HHU ratio in the product is in excess of 30:1 and preferably in excess of 50:1.

In embodiments of the invention the H3 triglyceride content is less than 3% and preferably less than 1% of the fat phase. H3 triglycerides leave a waxy impression in the mouth when present in large quantities.

In an embodiment of the present invention the fat is a refined soybean oil or a blend of soyabean oils, which have been subjected to no hydrogenation, interesterification or other chemical modification.

In addition to the colouring mentioned above, the fat phase ingredients can include conventional margarine additives such as vitamines A and E. While these materials may be present in the original fatty material certain types of refining may remove these components and it may be necessary to add suitable carotenes and/or tocopherols.

According to a second aspect of the present invention there is provided a process for the production of an emulsion as defined above, characterised in that it comprises the steps of;

a) forming an oil-in-water dispersion wherein the fat phase essentially consists of vegetable fat which has been subjected to refining and not chemically modified, b) cooling and working the product of step (a) to accomplish phase inversion.

Generally, the method aspect of the invention makes use of a "Votator" (RTM) apparatus to cool and work the product and effect phase inversion, as illustrated by the examples. However the method of the invention may make use of, for example, a continuous churn to effect phase inversion. Suitable for this purpose is the so-called "Fritsch" continuous butter-maker. Many other methods of spreads processing are known or suggested in the art.

Indeed the present invention is particularly well adapted for exploitation in developing countries, where the hydrogenation and interesterification technology cannot supply the demand for margarine fats. In particular, the invention can be embodied in a greatly simplified process for the production of margarine, which comprises:

a) crushing of seeds and extraction of oil, b) refining of the oil, and, c) cooling and working of the oil in the presence of an aqueous phase to form a spread.

A particular advantage of this process is that the oil need not be chemically modified between steps (b) and (c). Where no fractionation is employed the final product therefore contains all of the triglyceride complement of the original oil. It should be noted that step (a) need not be performed on a single site, as the crushed seeds and/or oilcake are themselves an article of commerce.

In a preferred embodiment of the present invention the aqueous phase of the vegetable cream comprises a lacteal fluid, preferably buttermilk or skim-milk. The skim-milk can be natural skim-milk or reconstituted by solution of skim-milk powder in a suitable aqueous medium. The by-product of butter manufacture, buttermilk, whether fresh or recombined can be employed as a component of the aqueous phase. Such materials not only contain valuable natural flavour ingredients but also have an emulsifier activity. It is known that if sufficient milk protein is present the addition of further emulsifier may be dispensed with.

DETAILED DESCRIPTION OF THE INVENTION

The present invention will be illustrated hereafter by way of examples;

EXAMPLE 1

Preparation of an 80% Fat Spread

A soy bean oil having the fatty acid content given below was selected from a range of oils obtained from bean oil mono-cultures.

The soybean source is believed to be identical to that described by Hammond and Fehr as the A6 germplasm line (Crop Science 23 192–193).

The oils were extracted with petroleum ether following milling, and the solvent removed by vacuum distillation. The oil was subjected to the conventional refining processes, of degumming, neutralisation, bleaching and deodorisation. Yield of oil was 15% which dropped to 11% after refining. The uncommonly low yield is attributed to the poor condition of the batch of beans used. The total cholesterol content of the oil was determined by GLC as 10.0 mg/kg which is about 10% lower than that normally found in soy bean oil.

The fatty acid composition of the oil was determined as follows.

| Fatty Acid | | Overall | 2-position | |
|---|---|---|---|---|
| Myristic | (M) | 00.1% | 00.1% | |
| Palmitic | (P) | 07.7% | 00.6% | |
| Hexadecenoic | | 00.1% | 00.1% | |
| Stearic | (S) | 32.7% | 01.7% | |
| Oleic | (O) | 24.1% | 42.4% | |
| Linoleic | (L) | 26.7% | 48.0% | |
| Linolenic | | 04.3% | 06.9% | |
| Eliadic | (E) | — | — | |
| Sum (O + L) | (U) | 50.1% | 90.4% | {major unsats.} |
| Sum (S + P) | (H) | 40.3% | 02.3% | {major sats.} |

As mentioned in the preamble, naturally occurring fats such as those employed herein do not contain trans (E) fatty acids.

In a second batch of oil the following results were obtained.

| Fatty Acids | | Overall | 2-position | |
|---|---|---|---|---|
| Sum Saturated | (H) | 44.1% | 01.8% | {C16–18 sat.} |
| Mono-unsaturated | (O) | 23.9% | 41.8% | {oleic} |

-continued

| Fatty Acids | | Overall | 2-position | |
|---|---|---|---|---|
| Poly-unsaturated | (L) | 32.0% | 56.4% | {linoleic} |
| Sum Unsaturated | (U) | 55.9% | 98.2% | {O + L} |

From these figures it can be seen that the HUH:HHU ratio is very high. The overall ratio of unsaturated to saturated fatty acids is around 1.3:1.

The tri-acyl glycerol content of the second batch of oil was as follows;

| Glyceride | Overall | |
|---|---|---|
| H3 | 0.76% | |
| HOH | 17.51% | |
| HHO | 0.33% | |
| HLH | 21.34% | |
| HHL | 0.39% | |
| H2O | 17.84% | |
| H2L | 20.73% | |
| H2U | 38.53% | |
| HUH | 38.85% | {HOH + HLH} |
| HHU | 0.72% | {HHO + HHL} |

The ratio of HUH:HHU is of the order of 50:1.

These batches of oil exhibited the following N-line after stabilisation for 16 hours;

| Temp | Batch 1 Solids % | Batch 2 Solids % |
|---|---|---|
| 10° C. | 42.2 | 48.8% |
| 15° C. | 32.8 | — |
| 20° C. | 17.7 | 21.7% |
| 30° C. | 0.1 | 0.1% |

A spread was manufactured from this fat. The spread had the following composition;

| FAT PHASE: | 80.25% | 80% | oil |
|---|---|---|---|
| | | 0.1% | monoglyceride |
| | | 0.25% | cetinol |
| | | tr. | Beta carotene |
| WATER PHASE: | 19.75% | 0.3% | skim-milk powder |
| | | 0.07% | K sorbate |
| | | 19.38% | Water |

The spread was processed at laboratory scale through a conventional A-A-C sequence with a throughput of 4 Kg/hr, an exit temperature on the second A-unit (900 rpm) of 7.7° C., an exit temperature on the C-unit (250 rpm) of 11° C. and a line pressure of 9 Bar. An unexpectedly good product resulted.

The product exhibited the following "Stevens" values;

| S5 (1 day) | 430 |
|---|---|
| S5 (1 week) | 432 |
| S10 | 280 |
| S15 | 114 |
| S20 | 42 |

Gloss measured at 15° C. was low, the product being variously described as "dull" and "not glossy": high gloss is a property of margarines rather than butter. The product was very quick in the mouth and exhibited excellent melting behaviour. The product compared very well with a successful commercially available margarine of which the fat blend comprised a plurality of hydrogenated and interesterified ingredients.

EXAMPLE 2

Preparation of a 40% Fat Spread

A fat identical to that employed in claim 1 was used to make a 40% wt fat spread. The spread had the following composition;

| FAT PHASE: | 40.00% | 39.5% | fat |
|---|---|---|---|
| | | 0.2% | monoglyceride |
| | | 0.2% | Bean oil lecithin |
| | | tr. | Beta carotene |
| WATER PHASE: | 60.00% | 3.0% | gelatine |
| | | 1.0% | skim-milk powder |
| | | 0.15% | K sorbate |
| | | 0.4% | NaCl |
| | | to 60% | Water |

The spread was processed at laboratory scale through a conventional A-C-A sequence with a throughput of 3 Kg/hr, an exit temperature on the first A-unit (500 rpm) of 8.7° C., an exit temperature on the C-unit (1400 rpm) of 12° C., an exit temperature on the second A unit (1000 rpm) of 10° C. and a line pressure of 2 Bar. An unexpectedly good product again resulted.

The product exhibited the following "Stevens" values at the indicated measuring temperatures;

| S10 | 240 |
|---|---|
| S15 | 149 |
| S20 | 38 |

The product exhibited excellent melting behaviour and compared very well with a successful commercially available 40% product.

What is claimed is:

1. A process for the production of an edible water in oil plastified emulsion spread wherein the fat phase is selected from the group consisting of a.) chemically unmodified vegetable fat and b.) a blend of chemically unmodified vegetable fats and wherein the fatty acid residues present in this fat phase have a ratio of C16 carbon and shorter chain fatty acids to 18 carbon fatty acids selected from the group consisting of stearic, oleic and linoleic acids of 0.09 or less and wherein of the triglycerides present in the fat phase, at least 30% have two H and one U fatty acids, wherein the H fatty acids are stearic and palmitic acids and the U fatty acids are oleic and linoleic acids, which comprises the steps of:

(a) forming an oil-and-water dispersion from the fat phase which consists essentially of said fat which has been subjected to refining and is not chemically modified, and a water phase and (b) cooling and working the product of step (a) to accomplish phase inversion.

2. An edible water in oil plastified emulsion spread wherein the fat phase is selected from the group consisting of a.) chemically unmodified vegetable fat and b.) A blend of chemically unmodified vegetable fats and wherein the fatty acid residues present in this fat phase have a ratio of $C_{16}$ carbon and shorter chain fatty acids to 18-carbon fatty acids selected from the group consisting of stearic, oleic and linoleic acids of 7.9:83.5 or less and wherein of the triglycerides present in the fat phase, at least 30% have two H and one U fatty acids, wherein the H fatty acids are stearic and palmitic acids and the U fatty acids are oleic and linoleic acids.

3. The edible emulsion spread according to claim 2 wherein the fat of the fat phase is a single, chemically unmodified fat.

4. The edible emulsion spread according to claim 2 wherein the fat of the fat phase is not fractionated.

5. An emulsion according to claim 2, wherein of the fatty acid residues present in the vegetable fat, a majority are 18-carbon fatty acid residues.

6. An emulsion according to claim 2, wherein at least 50% of the H2U triglycerides are in the symmetric configuration.

7. The emulsion according to claim 6, wherein at least 90% of the H2U triglycerides are in the symmetric configuration.

8. An emulsion according to claim 2, wherein at most 50% of the H2U triglycerides are H2O triglycerides, wherein O is oleic acid.

9. An emulsion according to claim 2, wherein the fat is a refined soybean oil.

10. An emulsion according to claim 2, essentially free of fatty acids in the trans configuration.

11. An emulsion according to claim 2, comprising less than 3% H3 triglyceride.

12. A spread according to claim 2 wherein the HUH:HHU ratio is in excess of 30:1.

13. The spread according to claim 12 wherein the HUH:HHU ratio is in excess of 50:1.

* * * * *